United States Patent [19]
Baumann et al.

[11] 3,813,079
[45] May 28, 1974

[54] QUICK CHANGE APPARATUS FOR EFFECTING GAS FLOW PRESSURE REDUCTION WITH LOW NOISE GENERATOR

[75] Inventors: Hans D. Baumann, Foxboro; Gareth Allan Keith, Needham, both of Mass.

[73] Assignee: Masoneilan International Inc., Norwood, Mass.

[22] Filed: Dec. 10, 1971

[21] Appl. No.: 206,700

[52] U.S. Cl.............. 251/127, 251/282, 251/361, 137/270, 137/625.37, 137/625.39
[51] Int. Cl............................................. F16k 47/00
[58] Field of Search .................. 138/42; 181/46, 56; 251/127, 282, 362, 210, 361; 137/269, 270, 625.37, 625.39

[56] References Cited
UNITED STATES PATENTS

| | | | |
|---|---|---|---|
| 831,742 | 9/1906 | Pownall | 251/362 |
| 944,155 | 12/1909 | Shurtleff | 137/270 |
| 1,802,897 | 4/1931 | Holden et al. | 251/210 |
| 3,304,949 | 2/1967 | Baumann | 137/270 |
| 3,601,147 | 8/1971 | Myers | 251/282 X |
| 3,606,911 | 9/1971 | Keith | 137/269 |
| 3,648,718 | 3/1972 | Curran | 251/282 X |
| 3,654,950 | 4/1972 | Hamm | 285/112 X |

*Primary Examiner*—Henry T. Klinksiek
*Attorney, Agent, or Firm*—Chittick, Thompson & Pfund

[57] ABSTRACT

Valve controlling gaseous flow without producing excessive noise. A plurality of multi-perforated, quick change trim cylinders effecting at least two stage pressure reduction. Adjacent of the cylinders having predetermined flow area ratios, and the inner cylinder being invertible to extend, and enclose the valve plug, to either side of the seat.

9 Claims, 6 Drawing Figures

PATENTED MAY 28 1974 3,813,079

PATENTED MAY 28 1974  3,813,079
SHEET 2 OF 2
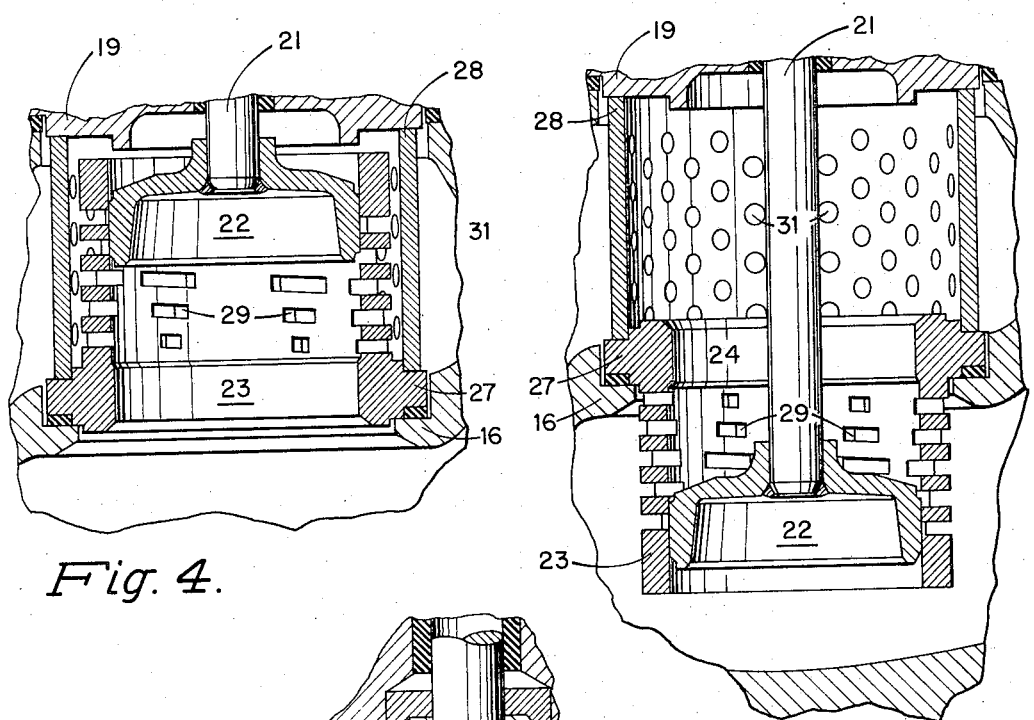
Fig. 4.
Fig. 5.
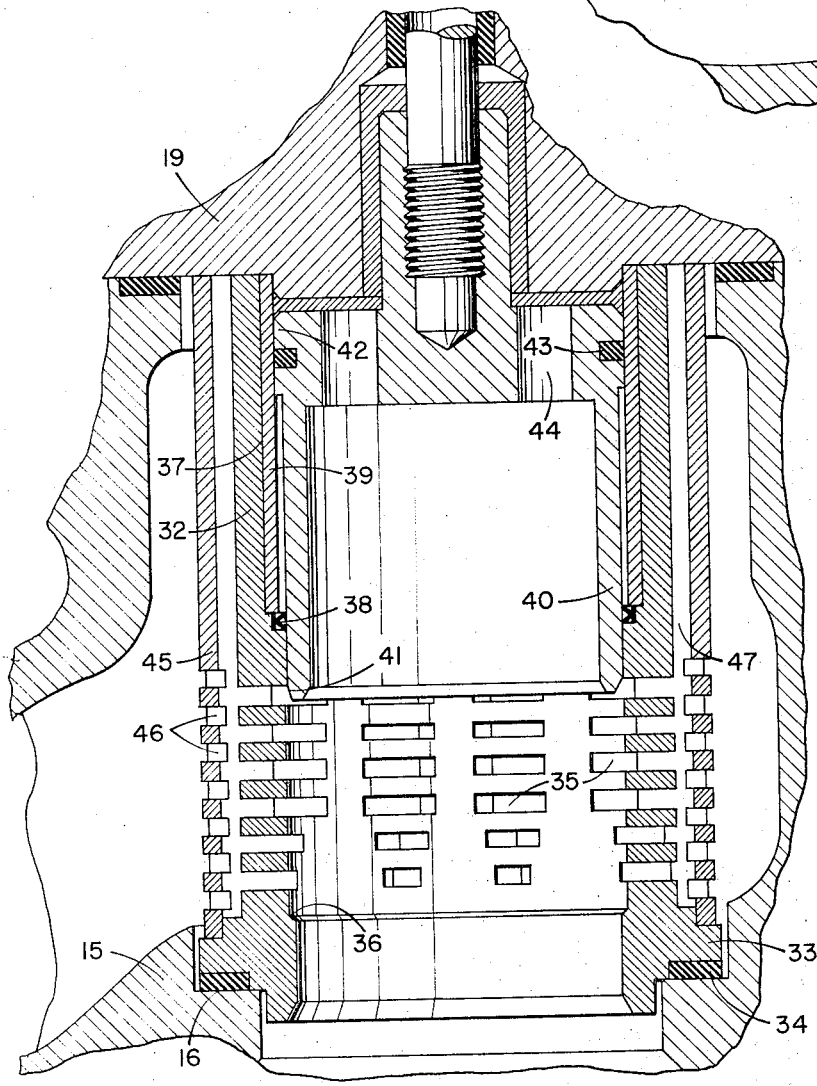
Fig. 6.

QUICK CHANGE APPARATUS FOR EFFECTING GAS FLOW PRESSURE REDUCTION WITH LOW NOISE GENERATOR

FIELD OF THE INVENTION

This invention pertains to devices for controlling high pressure gas flow in a conduit, and more particularly for reducing the pressure of the gaseous flow without producing excessive noise. The invention pertains more particularly to gas flow pressure reduction apparatus having a plurality of concentric, multi-perforated, quick change cylinders dividing the pressure drop, and thereby reducing throttling noise generation.

BACKGROUND OF THE INVENTION

The invention pertains to apparatus for reducing the pressure of gaseous media flowing through a duct or conduit, and more particularly for accomplishing the gas pressure reduction with minimum or greatly reduced generation of noise, or unwanted sound. The problems attendant upon the generation of noise include not only the human reaction criteria of annoyance, damage to hearing and reduction in work efficiency, but also the effect on physical structure and equipment, such as structural fatigue, and equipment malfunction.

In industrial plants, gas pressure reducing stations, and the like where are found the throttling valves or aerodynamically generated sound effects with which the invention is particularly concerned, the noise problems attendant thereon are rapidly intensifying in absolute terms, and have attained more recently a magnitude heightened also by increased human sensibility to noise pollution. But noise control effects have heretofore been limited generally to the use of mufflers, attenuation chambers and the like, or devices for absorption or insulation of the generated noise, and such as are exemplified, for example, by French Pat. No. 1,551,128. This invention, in contrast, cuts throttling noise at the source, and thereby achieves superior results both in reducing throttling noise and reducing mechanical vibration from levels experienced with conventional pressure reducing valves.

BRIEF SUMMARY OF THE INVENTION

In view of its novel aspects, the theoretical considerations on which the invention is rested are here set forth in aid of its full and clear understanding by those skilled in the art.

Fluid dynamic theory predicates a high dependence of the herein concerned throttling noise energy on the pressure drop ratio and fluid flow velocity. High pressure differentials across a jet or constriction in the fluid flow generate noise energy which increases at a rate greater than the rate of increase in the pressure drop ratio. The noise or vibration energy generated also varies with the eighth power of the fluid velocity in the jet. Both a high velocity, and a high pressure drop ratio, then, lead to high acoustical efficiency, or high energy conversion to noise.

By far the most efficient way to reduce throttling noise is, of course, to decrease the velocity of the flow. In accomplishing this by increasing the effective flow area only some of the resultant noise reduction is offset by the noise being a function also of flow area.

Any solid or fluid medium vibrating in response to noise energy waves will convert a portion of the energy it receives to heat. With fluids it is the fluid viscosity which occasions the conversion, or damping. A similar noise energy damping reaction occurs as well in solids.

Further, the amount of energy passed on through such media varies with the negative power of the distance that the energy travels within the medium. And in solids like the metals found in pipes, the attenuation in the medium increases with the frequency of the noise energy.

It is thus an object of the present invention to provide apparatus for pressure reduction or throttling of gas flow with a low accoustical efficiency.

It is a further object of the invention to provide an accoustical filter for absorbing downstream the noise of conventional valves and thereby preventing the radiation of that noise through the gas conduit walls to its external surroundings.

It is a further object of the invention to provide a device for throttling gas flow with greatly reduced noise generation by minimum gas velocity constricting jet means.

It is a further object of this invention to provide a pressure reducing or throttling device having constricting jet means characterized by lowered pressure drop thereacross.

It is a further object of the present invention to provide a pressure reducing apparatus which increases the viscous damping of the noise energy in the flowing gas.

It is a further object of the present invention to provide a gas pressure throttling device which generates noise at a frequency which provides for greater attenuation of the noise energy by the gas conduit.

It is a further object of the invention to absorb part of the aerodynamically created noise by a process of resonant damping within said throttling device.

BRIEF DESCRIPTION OF THE DRAWINGS

In the annexed drawings:

FIG. 4 is a vertical section of another embodiment of the invention apparatus;

FIG. 5 is a like view of the FIG. 4 embodiment with the inner cylinder inverted; and FIG. 6 is a vertical section of yet another embodiment of the invention apparatus.

DETAILED DESCRIPTION OF THE INVENTION

Figure 1:
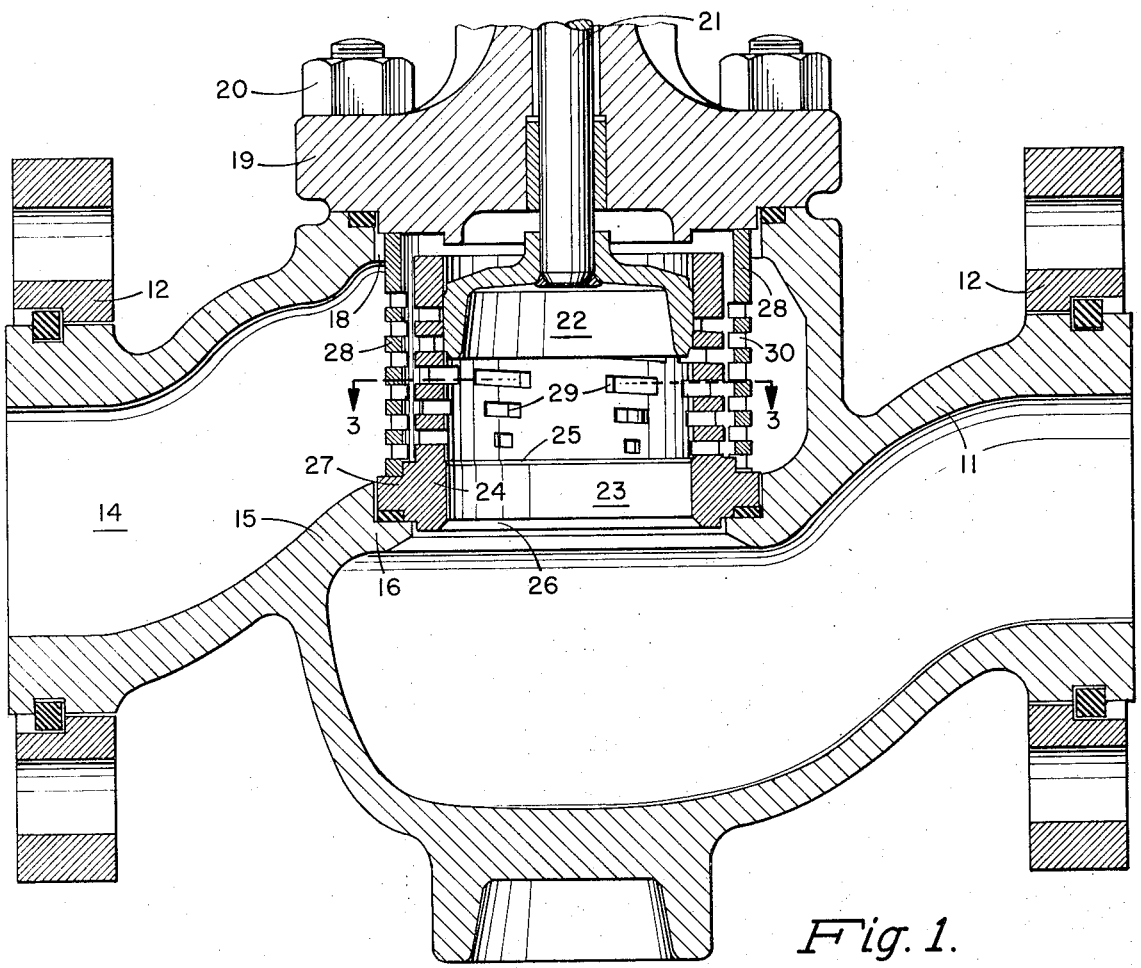
FIG. 1 is a vertical section of one embodiment of the invention apparatus.

The quick change control valve trim apparatus hereof is for controlling gaseous flow confined in a duct or conduit illustrated in the drawings as the conduit part or wall 11 adapted by flange fittings 12, 13 or otherwise for forming or coupling between adjacent parts of a gas line, and defining a gas confining wall having a flow passage 14 therewithin.

At a control valve or pressure reduction point therein the conduit part or wall 11 is interiorly divided by a transverse partition 15 apertured centrally by a transversely oriented port opening, as defined by the annular lip or ledge 16.

Opposite the partition port opening 16 is a conduit wall opening 18 passing the cylinders to be described, and closed by a cap or bonnet or the like 19, as may be removably secured by studs or the like 20.

Conduit wall opening 18 is arranged substantially coaxially with partition port opening 16. Supported and sealed centrally through bonnet 19 are control valve means comprising a stem 21 controlled, as conventionally, by actuator means external to the invention and therefore not shown, for reciprocation of stem-mounted plug 22 towards and away from the partition port opening 16, and from either side thereof, FIGS. 1, 2 and 4.

The low noise valve trim hereof further comprises an inner cylinder 23 arranged between transverse partition 15 and removable bonnet 19 and to enclose port opening 16, inner cylinder 23 thereby defining a pressure reduction stage for the gas flow through conduit 11. The cylinder 23, which in the FIGS. 1–5 forms is upstream, is herein illustrated also as generally smaller than the transverse partition port 16, and as extending in the FIG. 1 form from the ledge 16 to below the bonnet 19.

In the illustrated embodiments the inner cylinder is internally dimensioned for a sliding, guiding fit with the plug 22. In FIGS. 1–5 the inner cylinder also is invertible, by reason of a radially inwardly extending seat projection 24 having opposite faces 25, 26 of a taper conforming to that of the oppositely angled seating faces or peripheries 22a, 22b of plug 22.

Figure 2:
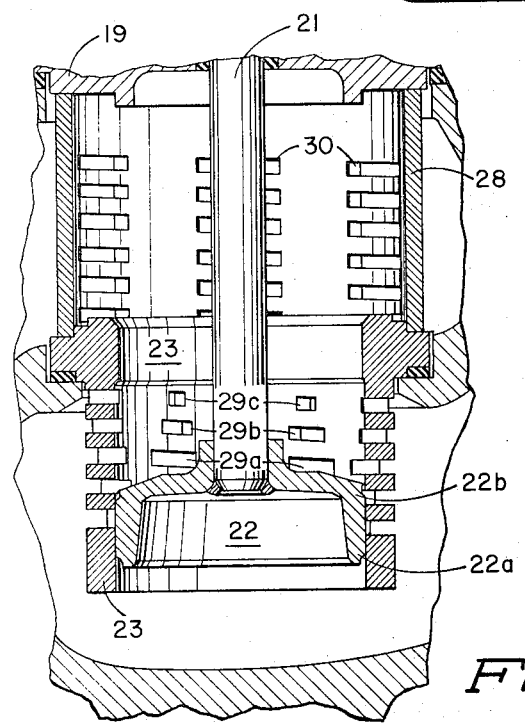
FIG. 2 is a like view showing the FIG. 1 embodiment with the inner cylinder inverted.

At the same end thereof the inner cylinder 23 has a radially outwardly extending projection or flange 27 which is double faced for seating on the ledge 16 both in the upstanding FIG. 1 and in the inverted FIG. 2 position.

The invention valve trim further comprises one or more coaxial or concentric, successively larger outer cylinders 28 engaged between the bonnet 19 and inner cylinder flange 27, and so seating the cylinder 23, both in the concentric or FIG. 1 and in the inverted or FIG. 2 positions of the latter.

Within the invention, it will be understood: there may be any number of the concentric cylinders; the valve seat ring may be formed integrally of the inner cylinder, as shown, or it may be separate, and removably supported on the ledge 16; the inner cylinder 23 may or may not be employed as a guide bushing for plug 22; and the next outer cylinder 28 may or may not be employed as retainer for the inner cylinder 23, or for a separate seat ring.

In accordance with the invention, the inner cylinder 23 defines one, and in the FIGS. 1–cylinder forms the primary, restriction flow area, by its being passaged by a multiplicity of jet orifices or holes 29. While the cylinder passages 29 can take any geometric shape, as well as have number and proportion to define any wanted flow area, in the illustrated embodiments the inner cylinder holes or passages 29 are shown as parallel-sided slots, said slots in the FIGS. 1–5 forms arranged in the pattern of, or oriented and aligned as the successive windings of, a helical thread.

The cylinder openings or slots are also herein comprised or arranged in circumferentially equidistant vertical columns, with the horizontally matched slots 29a, 29b, 29c of each column of similar and successively decreasing length, progressing towards the seat, and being also coaxial, or centered one above the next.

Forming the flow area openings in the wall of the cylinder 23 as the helically arranged slots 29 is found to be a design which lends itself to easier casting, which provides a good guiding surface for the plug 22, and which affords good flexibility in contouring flow characteristics.

The pressure reduction stage or restriction flow area means or cylinder 23 is further defined or characterized by a large number of small holes, and in a number: cross-sectional-area couple or combination which, for a given gaseous medium at a given or maximum expected flow rate, produces the desired low pressure drop across the cylinder 23, and which increases also the, or establishes a relatively high, vibratory frequency of the noise energy accompanying the said low pressure drop.

The concentric, successively larger, one or more outer cylinders 28 provide one or more complementary or combinational, and in the FIGS. 1–5 forms downstream or secondary and subsequent, stage pressure reduction or restriction flow areas, formed in FIGS. 1 and 2 by the passages 30 in the larger or outer cylinder 28 of the same parallel-sided form and helical pattern as shown and just described for the passages 29 of the smaller cylinder 23.

Under the invention, the passages 30 in the larger cylinder 28 define more particularly a constant flow area equal to substantially twice the flow area of the inner cylinder 23, when the plug 22 is in the full open position, or with all of the openings 29 uncovered. This described flow area increase compensates for the gas density changes occurring as the pressure is reduced across the inner cylinder 23. The particular, substantially 2:1 flow area ratio hereof affords, it will be understood, a reasonable or optimal distribution of the pressure drops across each cylinder, with both cylinders 23, 28 having, in other words, about the same pressure ratio.

The shifting of plug 22 by stem 21 to more nearly closed position results, of course, in the unbalancing of the outer cylinder: inner cylinder flow area ratio, or increasing of that to greater than 2:1, the which alters correspondingly the pressure drop distribution, from the described equality. But in such plug closing the flow energy is also reduced, and hence the resulting noise level is relatively lower than at the full open plug position.

Under this invention also the helical slots 29, 30 are relatively arranged as though cut along, or from, out-of-phase lengths of alternate threads, yielding complete non-alignment of flow area passages through adjacent cylinders, and resulting thereby in maximum directionality change of the flowing gas stream.

In the preferred embodiment of FIG. 6, the inner cylinder 32 has a radially outwardly projecting flange 33 received on the recessed shoulder or lip 16 of intermediate partition 15, and as may be sealed thereon by a gasket 34 that may be recessed into said flange 33 as shown.

The passages 35 of the FIG. 6 inner cylinder are seen as rectangular, laterally and vertically aligned, and in vertical columns of length diminishing toward the plug seat 36, as heretofore.

Cylinder 32 is uniquely formed above the passages 35 with a bore enlargement 37 defined at the bottom by stepped shoulders on the lower-outer of which is seated a flexible or "K" seal 38, and on the upper-inner of which is supported a snugly fitting guide sleeve 39 overlying partially also flexible seal ring 38.

The FIG. 6 plug 40 is of greater length than in the FIGS. 1-5 forms, and terminates in a bottom seat taper 41 mating with cylinder seat 36.

Cylindrical plug 40 further has an annular enlargement or flange 42 for guiding or sliding on sleeve 39, and recessed to receive an O ring or the like 43 for sealing its engagement therewith. The length of the smaller portion of plug 40 is such that, when taper 41 seats against mating cylinder seat 36, plug flange 42, by its internal shoulder, seatingly engages and compresses K-seal 38, thereby providing two points of tight shutoff contact area within the low noise plug.

Plug 40 also is axially apertured, as at 44, to admit therebehind the pressure fluid within the conduit, whereby to balance the same, and so qualify it as a balanced tight shutoff plug.

In the FIG. 6 form also one or more outer sleeves or cylinders 45 are engaged between partition 15 and cap or bonnet 19, as by seating on inner cylinder flange 33. The outer cylinder or cylinders have the passages 46 rotated from or misaligned with, the passages of the adjacent cylinder or cylinders, and which may be provided in the same or similar rectangular configuration and aligned row and column arrangement as described and shown for the inner cylinder 32.

In the FIG. 6 form as well, a resonant cavity 47 is defined between each adjacent pair of the cylinders 32, 35.

It will be appreciated that whereas in the FIGS. 1-5 forms the inner cylinder 23 is the upstream primary flow restriction area, the FIG. 6 balanced plug form or feature is utilized with flow from the outside to the inside of the cage. Accordingly, in the FIG. 6 form, the order of relative increase of the flow areas is from the outside to the inside cylinder.

The flow area passage configurations, sizes, and numbers, and the resonant damping chamber volumes, are determined for the FIG. 6 embodiment similarly as described for the FIGS. 1-5 forms.

Herein incorporated by reference is the prior application of Hans D. Baumann Ser. No. 40,607 filed May 26, 1970, now U.S. Pat. No. 3,665,965 granted May 30, 1972, and titled "Apparatus for Reducing Fluid Pressure with Low Noise Generation", to which reference is made particularly for the discussion of the low noise plates assembly thereof, in that the low noise cylinders assembly of this invention and application is characterized, distinguished, and advantaged commonly with said low noise plates assembly in these respects.

First, aperturing of the plates-cylinders by a large number of small flow passages, as opposed to one large passage, serves to increase the frequency of the noise produced, and thereby to make the pipe wall a more effective insulator; and it results also in a rapid dissipation of the downstream jet due to its large surface area for shear interaction and turbulent mixing downstream, the same reducing the acoustical efficiency.

Second, the two or more stage pressure reduction divides or decreases the pressure drop across each stage, and thereby also substantially reduces the acoustical efficiency and consequent noise level, the efficiency being highly dependent on the pressure drop across an orifice.

To illustrate this pressure drop dividing design principle, if a single orifice be assumed to have a pressure ratio of 4 to 1, the equivalent two stage reduction, properly designed for density compensation, would comprise two noise sources having pressures ratios of 2 to 1. A reduction in pressure ratio from 4 to 1 to 2 to 1 results in a decrease in noise level of about 13 db. Accordingly, assuming both stages had an equal sound level, the net decrease in noise level would be about 10 db, not counting the decrease produced by resonant damping and high frequency attenuation.

Third, the provision of a defined spacing between the primary and secondary or two (or more) stage restrictions or cylinders (or plates) enables the optimizing of the effect of resonant damping. The provision of a properly selected spacing results, in other words, in a partial cancellation of the sound waves produced at the upstream pressure reduction stage by the sound wave reflected or generated in the resonant chamber between the stages.

It will be appreciated that the last mentioned resonant damping feature is afforded by the cylinders hereof when arranged in the concentric or FIGS. 1, 4 and 6 configuration, but not also when the inner cylinder is inverted to the position shown in FIGS. 2 and 5.

Figure 3:
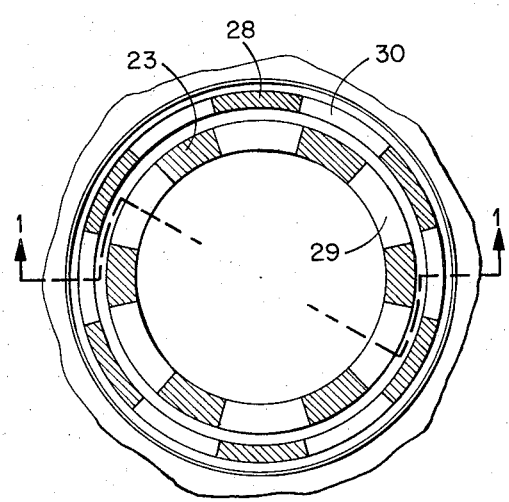
FIG. 3 is a partial horizontal section view on the line 3—3 of FIG. 1.

In the alternative embodiment of FIGS. 4 and 5, which in other respects is seen to follow the FIGS. 1-3 form, the openings or perforations through the outer cylinder are shown as round or drill holes 31.

It will be understood that in all invention embodiments: the flow characteristic can take any shape; the perforations in the cylinders can take any geometric shape, the flow area ratio of the outer cylinder to the inner cylinder can be less than, equal to, or greater than 1:1; and the spacing between the cylinders can vary.

It will be appreciated moreover that numerous and varied mounting or supporting constructions or arrangements of the inner and one or more outer cylinders are comprehended within the invention, including, as well as the illustrated forms, other forms in which the invention may be embodied by one skilled in the art.

We claim:

1. Apparatus for reducing the pressure of gas flowing in a conduit, and for accomplishing such gas pressure reduction with greatly reduced generation of throttling noise, and comprising, in combination, conduit means defining a gas confining wall;

a gas flow passage formed within said confining wall;

a transverse partition interiorly dividing said gas flow passage;

an annular port opening through said transverse, passage dividing partition;

a conduit wall opening opposite said partition port opening;

a bonnet removably closing said conduit wall opening;

a valve stem guided through said bonnet for reciprocation coaxially of said partition port opening;

a valve plug mounted coaxially of and for reciprocation with said stem, towards and away from said partition port opening;

means providing a primary pressure reduction stage for the gas flowing through said conduit, comprising an inner or outer cylinder supported between said transverse partition and said removable bonnet and in coaxial relation to said port opening, and a large number of small jet orifices in said inner or outer cylinder, said large number of small jet orifices constituting said inner or outer cylinder as a primary restriction flow area means;

means providing at least one secondary pressure reduction stage for the gas flow through said conduit, comprising at least one complementary, outer or inner cylinder concentric with said primary reduction stage, inner or outer cylinder, and a large number of small jet orifices in said at least one complementary, outer or inner cylinder, said large number of small jet orifices constituting said at least one complementary, outer or inner cylinder as a secondary restriction flow area means;

the number: cross-sectional-area combination of said jet orifices in said inner or outer, primary pressure reduction stage cylinder, and in said at least one outer or inner, secondary pressure reduction stage cylinder, being that which, for a given gaseous medium at a given or maximum expected flow rate, produces a low pressure drop across the cylinder, and the number: cross-sectional-area combination of said jet orifices in said inner or outer, primary reduction stage cylinder, and in said at least one outer or inner, secondary pressure reduction stage cylinder, being that which, for a given gaseous medium at a given or maximum expected flow rate, establishes a relatively high vibratory frequency of noise generation by the cylinder, whereby the acoustical efficiency of said gas pressure reducing apparatus is reduced both by increased conduit attenuation and by increased downstream jet shear interaction and turbulent mixing;

the restriction flow area of each succeeding one of said pressure reduction stage cylinders being increased, through greater number and/or size of its jet orifices, relative to the restriction flow area of the next preceding one of said pressure reduction stage cylinders, to such an extent as compensates for the gas density changes resulting from the gas pressure drop across said next preceding one of said pressure reduction stage cylinders;

the restriction flow areas of said primary and secondary restriction flow area means being so relatively proportioned as to effect substantially equal pressure drops across said primary and secondary pressure reduction stages; and means for further reducing the acoustical efficiency of said gas pressure reduction apparatus by resonant damping, comprising a resonant damping cavity established between each couple of said primary and secondary flow area means cylinders and within said confining wall of said gas conduit, the spacing between said primary and secondary restriction flow area means cylinders, and thereby the volume of said resonant damping cavity between each cylinder couple, calculated for a resonant frequency substantially equal to the sound frequency of the cylinder opening into the cavity.

2. The apparatus of claim 1, wherein the innermost of said primary and secondary restriction flow area means cylinders slidably receives said valve plug, whereby the reciprocation of said stem and plug covers and uncovers the jet orifices of said innermost cylinder and thereby varies its said restriction flow area.

3. The apparatus of claim 1, wherein, as to any adjacent two of said primary and at least one secondary pressure reduction stage cylinders, the flow area of the second or downstream of said cylinders is twice the flow area of the first or upstream of said cylinders.

4. The apparatus of claim 1, wherein said innermost of said cylinders has a radially inwardly projecting seat for said plug.

5. The apparatus of claim 1, wherein said innermost of said cylinders has a radially outwardly projecting seat for said at least one outer cylinder.

6. The apparatus of claim 1, wherein the jet orifices in said primary pressure reduction stage cylinder comprise helical slots, and wherein the jet orifices in said at least one secondary pressure reduction stage cylinder comprise round holes.

7. The apparatus of claim 1, wherein the jet orifices of at least one of said restriction flow area means cylinders comprise vertical, substantially equidistant columns of helical slots.

8. The apparatus of claim 7, wherein the slots of said vertical columns are gradually reducing in length, in the progression of said columns toward said partition.

9. The apparatus of claim 7 wherein the centerpoints of said helical slots are vertically aligned, whereby said slots are all uniformly distributed circumferentially of said cylinder.

* * * * *

UNITED STATES PATENT OFFICE
CERTIFICATE OF CORRECTION

Patent No. 3,813,079　　　　　　　　Dated　May 28, 1974

Inventor(s)　Hans D. Baumann and Gareth Allen Keith

It is certified that error appears in the above-identified patent and that said Letters Patent are hereby corrected as shown below:

In the title, the last word should read -- GENERATION --

In column 3, line 52, delete "Figs. 1-cylinder forms the" and insert -- Figs. 1-5 forms the --

Signed and Sealed this

Twenty-sixth Day of April 1977

[SEAL]

Attest:

RUTH C. MASON
Attesting Officer

C. MARSHALL DANN
Commissioner of Patents and Trademarks